US008090964B2

(12) United States Patent
Kitajima

(10) Patent No.: US 8,090,964 B2
(45) Date of Patent: Jan. 3, 2012

(54) MULTI-FUNCTION PERPIHERAL DEVICE

(75) Inventor: Tetsuya Kitajima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 880 days.

(21) Appl. No.: 12/039,329

(22) Filed: Feb. 28, 2008

(65) Prior Publication Data

US 2009/0055673 A1 Feb. 26, 2009

(30) Foreign Application Priority Data

Feb. 28, 2007 (JP) ................. 2007-050479

(51) Int. Cl.
*G06F 1/32* (2006.01)
(52) U.S. Cl. .................. 713/300; 713/320; 713/324
(58) Field of Classification Search .................. 713/300, 713/320, 323, 324; 710/14, 18
See application file for complete search history.

(56) References Cited

U.S. PATENT DOCUMENTS

| | | | | |
|---|---|---|---|---|
| 5,974,489 A * | 10/1999 | Williams et al. | .............. | 710/302 |
| 5,987,535 A * | 11/1999 | Knodt et al. | ..................... | 710/15 |
| 6,564,073 B1 * | 5/2003 | Uggmark et al. | .............. | 455/573 |
| 2003/0100308 A1 * | 5/2003 | Rusch | ............................ | 455/445 |
| 2004/0024870 A1 * | 2/2004 | Hirata et al. | .................. | 709/224 |
| 2004/0076177 A1 * | 4/2004 | Koch et al. | ..................... | 370/465 |
| 2004/0246512 A1 * | 12/2004 | Miyamoto | ................... | 358/1.13 |
| 2005/0270052 A1 * | 12/2005 | Chase | ............................ | 324/763 |
| 2007/0061512 A1 * | 3/2007 | Taguchi et al. | ............... | 711/114 |
| 2008/0229121 A1 * | 9/2008 | Lassa et al. | .................... | 713/300 |

FOREIGN PATENT DOCUMENTS

| | | |
|---|---|---|
| JP | H08-149178 A | 6/1996 |
| JP | 2006007785 A | 1/2006 |

* cited by examiner

*Primary Examiner* — Mark Connolly
*Assistant Examiner* — Paul Yanchus, III
(74) *Attorney, Agent, or Firm* — Baker Botts L.L.P.

(57) ABSTRACT

A multi-function peripheral device includes: a plurality of interfaces that communicate data with an external devices; a power source for supplying the interfaces with power required for the respective interfaces to operate; a monitoring unit that monitors operational statuses of the respective interfaces; a display unit that displays a parameter indicating the operational status of each of the interfaces monitored by the monitoring unit; an input unit that is capable of inputting a command indicating whether or not power is to be supplied from the power source to each of the interfaces; and a power control unit that controls to supply power to an interface for which a command indicating that power is to be supplied is inputted by the input unit, and controls to shut off power to an interface for which a command indicating that power is not to be supplied is inputted by the input unit.

6 Claims, 10 Drawing Sheets

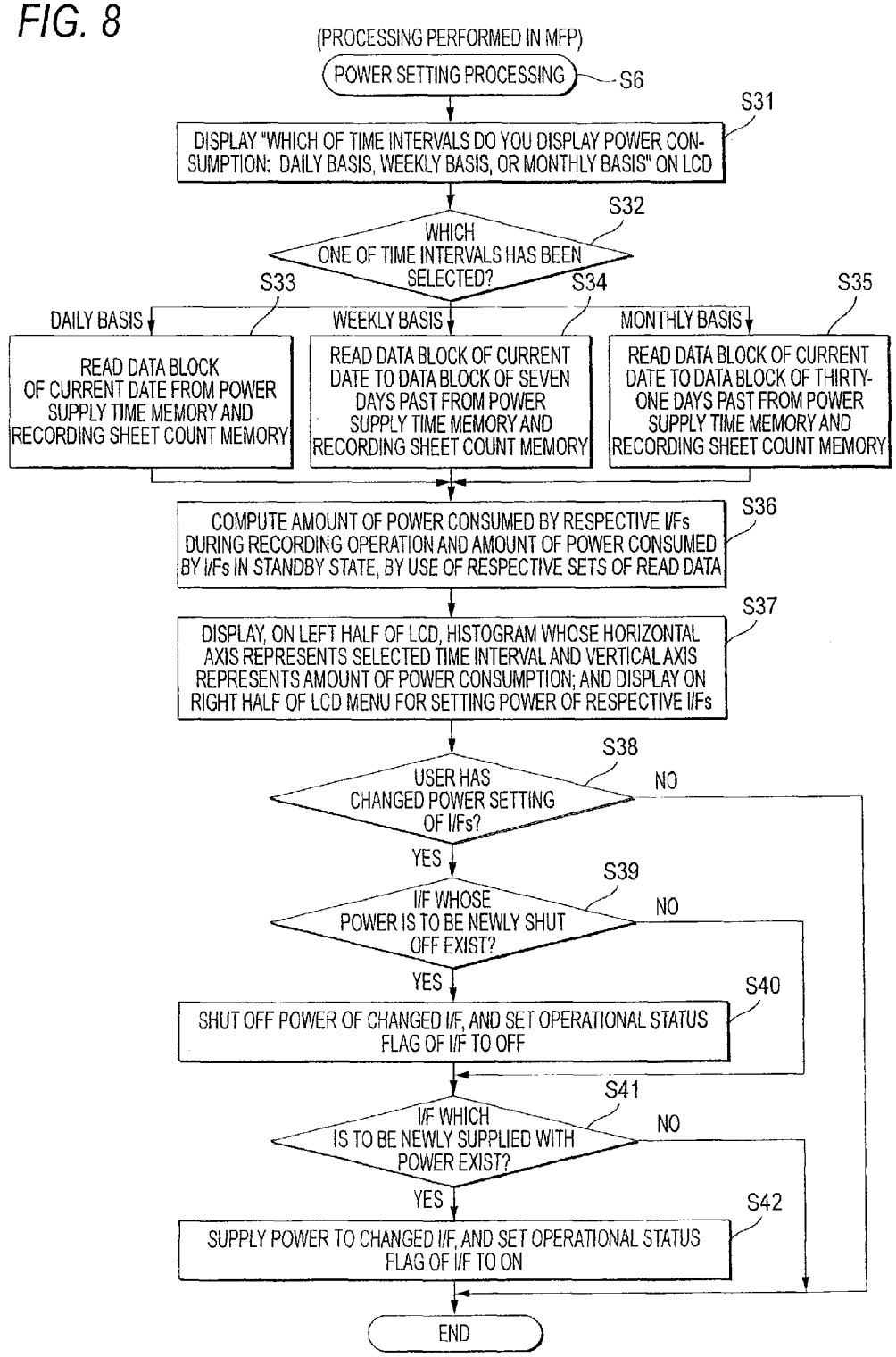

FIG. 9A

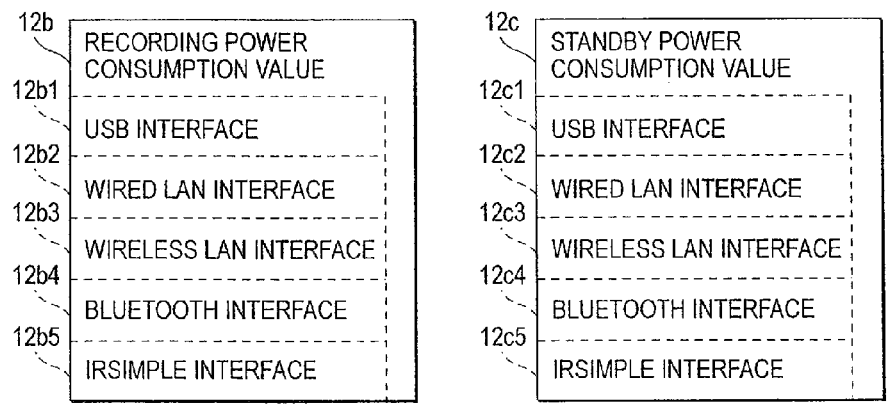

FIG. 9B

AMOUNT OF POWER CONSUMED
BY INTERFACE DURING RECORDING = RECORDING POWER CONSUMPTION VALUE
　　　　　　　　　　　　　　　　　　12b OF INTERFACE
　　　　　　　　　　　　　　　　　　　　× NUMBER OF SHEETS ON WHICH
　　　　　　　　　　　　　　　　　　　　　RECORDING DATA RECEIVED BY INTERFACE
　　　　　　　　　　　　　　　　　　　　　ARE RECORDED
　　　　　　　　　　　　　　　　　　　　　(RECORDING SHEET COUNT MEMORY 14c)

AMOUNT OF POWER CONSUMED
BY INTERFACE IN STANDBY STATE = STANDBY POWER CONSUMPTION VALUE
　　　　　　　　　　　　　　　　　　12c OF INTERFACE
　　　　　　　　　　　　　　　　　　　　× TIME DURING WHICH POWER IS SUPPLIED
　　　　　　　　　　　　　　　　　　　　　TO INTERFACE
　　　　　　　　　　　　　　　　　　　　　(POWER SUPPLY TIME MEMORY 14b)

MULTI-FUNCTION PERPIHERAL DEVICE

CROSS-REFERENCE TO RELATED APPLICATION

This application claims priority from Japanese Patent Application No. 2007-050479, filed on Feb. 28, 2007, the entire subject matter of which is incorporated herein by reference.

TECHNICAL FIELD

Aspects of the present invention relate to a multi-function peripheral device and, more particularly, to a multi-function peripheral device that enables a user to select an operational state of an interface according to a use environment and that can also reduce power consumed by the entire device.

BACKGROUND

Multi-function peripheral devices have a plurality of functions, such as a printer function and a scanner function. In relation to such multi-function peripheral devices, JP-A-8-149178 describes a technique to monitor use statuses of respective functional blocks. Then, an operational state of a functional block which has not been utilized for a given period is changed from a normal state to a standby state. When the functional block is changed to the standby state, application of power to the functional block is reduced, and hence the power consumed by the entire device can be saved.

In order to connect a multi-function peripheral device and a personal computer (PC) so that a user can operate the multi-function peripheral device with the PC, no alternative way exists other than to connect with a certain cable to certain interfaces (e.g., a Centronics interface) that is provided only one in each of the PC and the multi-function peripheral device. In conjunction with recent improvement in communications technology, various communication schemes, including radiocommunication, have been put into practical use, and a PC or a multi-function peripheral device has been provided with a plurality of interfaces. As a result, a user has become able to select an optimum interface (a connection method) according to a user's use environment. However, even when a plurality of interfaces are provided between the PC and the multi-function peripheral device, an interface used for connection between the PC and the peripheral device is usually one. Therefore, other interfaces than the used interfaces might wastefully consume power.

According to the technique described in JP-A-8-149178, the functional block is changed to the standby state to suspend the operation of the functional block, thereby saving power consumption. However, in order to utilize the function in standby state, operation for changing the function into a normal condition is required. Therefore, the function can not be used immediately.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a multi-function peripheral device that enables the user to select an operational state of an interface according to a use environment and that enables a reduction in power consumed by the entire device.

According to an exemplary embodiment of the present invention, there is provided a multi-function peripheral device including: a plurality of interfaces that communicate data with an external devices; a power source for supplying the interfaces with power required for the respective interfaces to operate; a monitoring unit that monitors operational statuses of the respective interfaces; a display unit that displays a parameter indicating the operational status of each of the interfaces monitored by the monitoring unit; an input unit that is capable of inputting a command indicating whether or not power is to be supplied from the power source to each of the interfaces; and a power control unit that controls to supply power to an interface for which a command indicating that power is to be supplied is inputted by the input unit, and controls to shut off power to an interface for which a command indicating that power is not to be supplied is inputted by the input unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 8 is a flowchart showing power setting processing of MFP;

FIGS. 9A and 9B are views showing a method for computing amounts of power consumed during recording operation and amounts of power consumed in a standby state.

DETAILED DESCRIPTION

Figure 1:
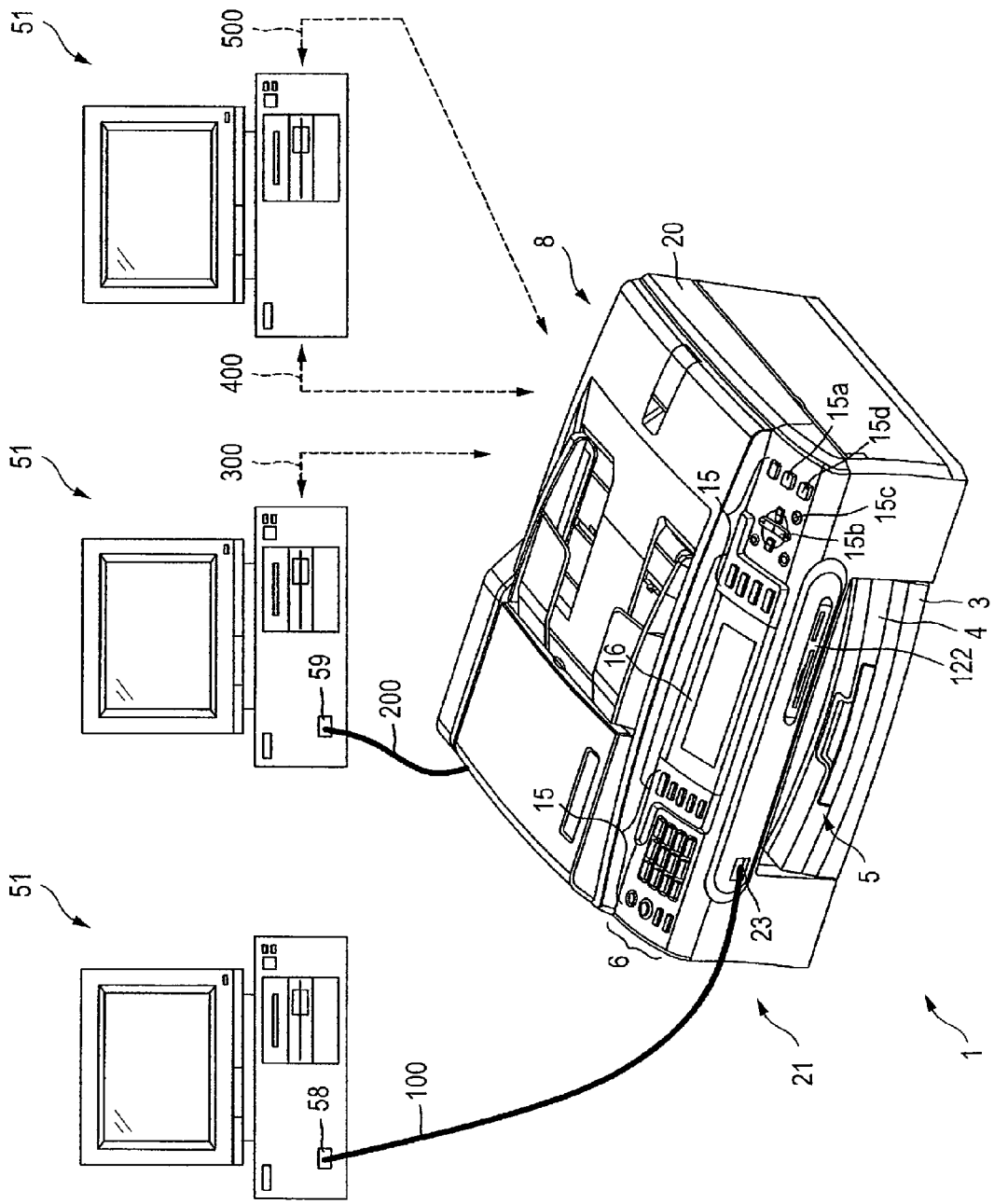
FIG. 1 is a perspective view showing an external configuration of a multi-function peripheral (MFP) and an external configuration of a personal computer (PC) according to an exemplary embodiment of the present invention.

Exemplary embodiments of the present invention will be described hereunder with reference to the accompanying drawings. FIG. 1 is a perspective view showing an external configuration of a multi-function peripheral device (hereinafter abbreviated as an MFP) 1 and an external configuration of a personal computer (hereinafter abbreviated as a "PC") 51 according to an exemplary embodiment of the present invention. The MFP 1 has various functions such as a printer function, a scanner function, and a copier function.

FIG. 1 shows a state where the MFP 1 and the PC 51 are used while being connected together. Each of the MFP 1 and the PC 51 has a plurality of interfaces 23 to 25, 27, and 29 (see FIG. 2). When interfaces of the same type are connected together through a wire or wireless communication, data communication can be performed with the interfaces. It is noted that, as shown in FIG. 1, the MFP 1 is capable of communicating with a plurality of PCs 51, each of which has a plurality of interfaces 23 to 25, 27 and 29. However, the PCs 51 may have only a part of the interfaces 23 to 25, 27 and 29.

For instance, when a user transmits recording data from the PC 51 to the MFP 1 in order to record the recording data on a recording sheet, a user selects any one of interfaces 58 to 60, 62, and 64 of the PC 51 (see FIG. 4), thereby transmitting the recording data to the MFP 1. The recording data is received by any one of interfaces 23 to 25, 27, and 29 of the MFP 1 (see FIG. 2) that is the same type as the interface used for transmitting the recording data from the PC 51. Specifically, a user can arbitrarily select any one from the interfaces 23 to 25, 27, and 29 (see FIG. 2) for use in data communication between the PC 51 and the MFP 1. However, an available interface among the interfaces 58 to 60, 62, and 64 (see FIG. 4) of the PC 51 is limited according to a use environment of the PC 51. Then, a user can change the interface 23, 24, 25, 27, or 29 (see FIG. 2) used for data communication with the MFP 1 according to the use environment. FIG. 1 shows a case where a user selects one from the interfaces 23 to 25, 27, and 29 (see FIG. 2) used for data communication with the MFP 1 according to the use environment of the PC 51, thereby using the MFP 1.

Referring to mainly FIG. 1, the overall configuration of the MFP 1. The MFP 1 includes an opening section 5 formed in the front of a body thereof. Inside of the opening section 5 is partitioned into an upper part and a lower part. In the lower part of the opening section 5, a sheet feeding cassette 3 capable of housing a plurality of recording sheets in the form of a stack is inserted. The sheet feeding cassette 3 is able to house recording sheets cut into an A4 size or the like. The upper part of the opening section 5 serves as a sheet discharging section 4 into which a recorded recording sheet is discharged.

The body of the MFP 1 includes an inkjet printer 21 installed therein. The inkjet printer 21 prints on a recording sheet set at a predetermined sheet feeding position (not shown) in accordance with a command from a CPU 11 (see FIG. 2). The printer 21 has a recording sheet conveyance motor (not shown) for conveying recording sheet, a print head (not shown) for ejecting ink to the recording sheet, and a carriage motor (not shown) for moving a carriage (not shown) carrying the print head.

A scanner 20 for reading a document at the time of performing a scanner function or a copier function is disposed above the opening section 5. A placement glass plate (not shown) used for placing a document is provided on a lower side of a document cover body 8. When a document is read, the document cover body 8 is opened upwardly; the document is placed on the placement glass plate; and the document is fixed by closing the document cover body 8. When a document reading key 15d of an operation key 15 is depressed, an image on document sheet is read by a document reading sensor (not shown) provided below the placement glass plate. The thus-read image data are stored in a predetermined storage area in RAM 13 (see FIG. 2) which will be described later. For instance, a contact image sensor (CIS) or a charged coupled device (CCD) is used as the document reading sensor of the scanner 20.

A horizontally-oriented operation panel 6 is provided in a front of the document cover body 8 and has an operation key 15, an LCD 16, and a speaker 17 (not shown). The operation key 15 includes a power setting key 15a for displaying a power setting menu on the LCD 16; a cross key 15b used for selecting an interface, power setting of which is to be changed; an enter key 15c for reflecting changed power settings; and a document reading key 15d for reading a document. A user can perform operation for activating/deactivating a power source, switching among functions, and the like, by depressing various keys of the operation key 15.

The LCD 16 displays a menu, processing procedures, and the status of processing being executed. Since information corresponding to depression of the operation key 15 is displayed, a user can check image data to be recorded, various pieces of information about the printer 21, or the like. The speaker 17 sends an operation sound of the operation key 15 or a caution sound arising at the time of occurrence of an error to a user.

A memory card slot 122 for use in insertion of a memory card 22a is provided in the front of the opening section 5. When the memory card 22a is inserted into the memory card slot 122, the image data stored in the memory card 22a can be recorded on a recording sheet by the printer 21, or the image data read by the scanner 20 can be stored in the memory card 22a.

A connect port of a USB interface 23 into which one end of a USB cable 100 is to be inserted is opened in the front of the opening section 5. The one end of the USB cable 100 is inserted into the connect port of the USB interface 23, and the other end of the same is connected to a connect port of a USB interface 58 (see FIG. 4) provided in the PC 51. Thereby, the MFP 1 and the PC 51 become able to perform data communication through the USB cable 100.

Although unillustrated, a connect port of a wired LAN interface 24 (see FIG. 2) into which one end of a LAN cable 200 is to be connected is opened in the rear of the MFP 1. One end of the LAN cable 200 is connected to the connect port of the wired LAN interface 24, and the other end of the same is connected to a connect port of a wired LAN interface 59 (see FIG. 4) of the PC 51, whereby the MFP 1 and the PC 51 become able to perform data communication through the LAN cable 200.

Figure 2:
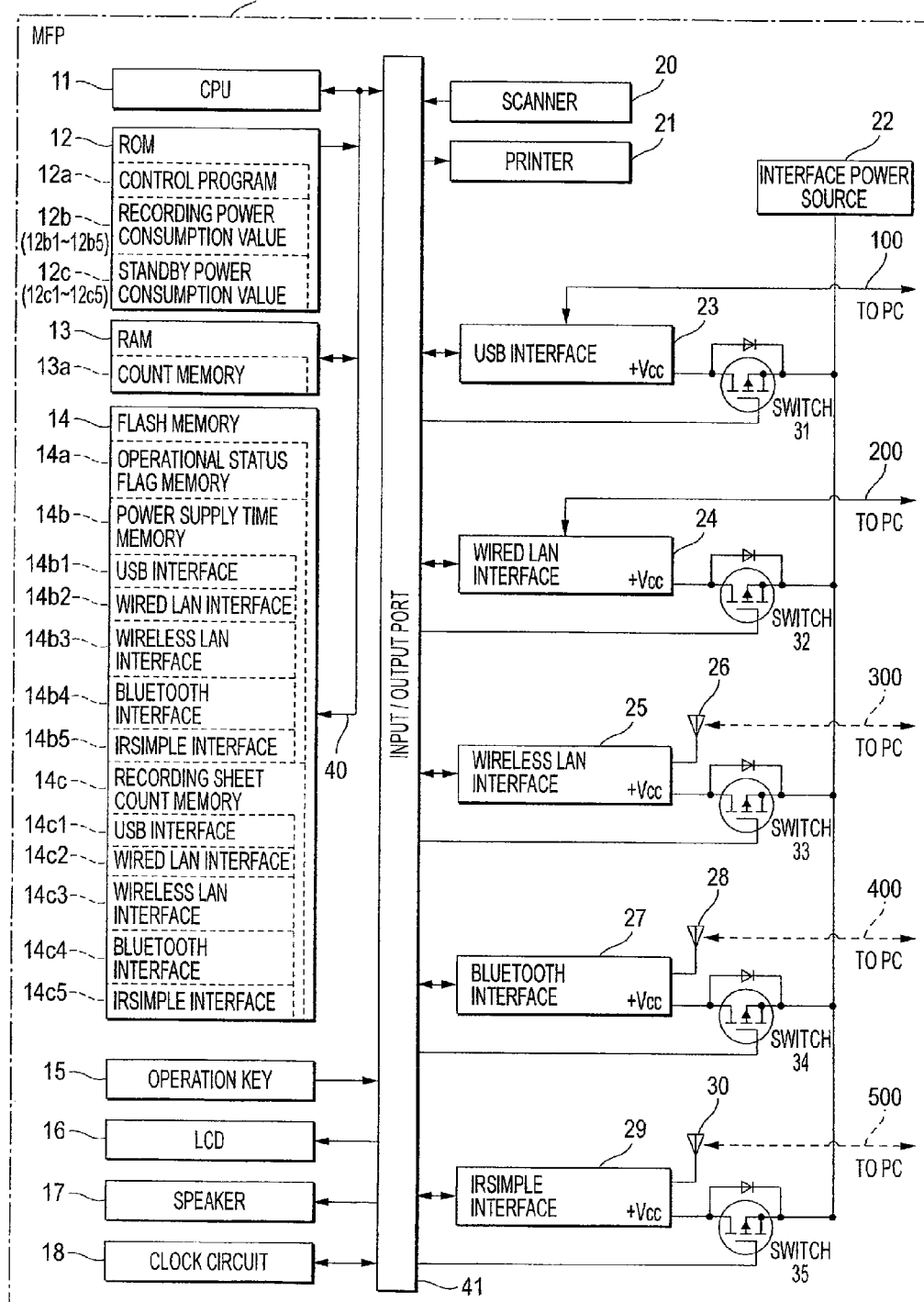
FIG. 2 is a block diagram showing an electrical configuration of the MFP.

Likewise, although unillustrated, a wireless LAN interface 25 and a wireless LAN antenna 26 that perform wireless data communication are provided in the body of the MFP 1 (see FIG. 2). Similarly, a wireless LAN interface 60 and a wireless LAN antenna 61 are provided in the body of the PC 51, as well (see FIG. 4). Accordingly, the MFP 1 and the PC 51 are able to perform data communication when their wireless LAN interfaces are linked together through wireless communication 300.

Likewise, although unillustrated, a Bluetooth interface 27 and a Bluetooth antenna 28 that perform wireless data communication are provided in the body of the MFP 1 (see FIG. 2). Similarly, a Bluetooth interface 62 and a Bluetooth antenna 63 are provided in the body of the PC 51, as well (see FIG. 4). Accordingly, the MFP 1 and the PC 51 are able to perform data communication when their Bluetooth interfaces are linked together through wireless communication 400.

In addition, although unillustrated, an Irsimple interface 29 and Irsimple antenna 30 that perform infrared data communication are provided in the body of the MFP 1 (see FIG. 2). Moreover, an Irsimple interface 64 and Irsimple antenna 65 are provided in the body of the PC 51, as well (see FIG. 4). Accordingly, the MFP 1 and the PC 51 are able to perform data communication when their Irsimple interfaces are linked together through infrared communication 500.

An electrical configuration of the MFP 1 will now be described with reference to FIG. 2. FIG. 2 is a block diagram showing the electrical configuration of the MFP 1. The MFP 1 has a CPU 11, ROM 12, RAM 13, flash memory 14, the operation key 15, the LCD 16, the speaker 17, a clock circuit 18, the scanner 20, the printer 21, an interface power source 22, the USB interface 23, the wired LAN interface 24, the wireless LAN interface 25, the Bluetooth interface 27, the Irsimple interface 29, and switches 31 to 35.

The CPU 11, the ROM 12, and the RAM 13 are interconnected through a bus line 40. The operation key 15, the LCD 16, the speaker 17, the clock circuit 18, the scanner 20, the printer 21, the USB interface 23, the wired LAN interface 24, the wireless LAN interface 25, the Bluetooth interface 27, the Irsimple interface 29, the switches 31 to 35, and the bus line 40 of the MFP 1 are interconnected through an input/output port 41.

The CPU 11 of the MFP 1 controls fixed values and programs stored in the ROM 12 and the RAM 13 and functions of the MFP 1; and also controls respective sections connected to the input/output port 41 in accordance with various signals transmitted or received by the respective interfaces 23 to 25, 27, and 29. The ROM 12 is unrewritable memory and has a control program area 12a storing programs that are executed by the MFP 1 and are shown by flowcharts shown in FIGS. 5, 6, 7, and 8; a recording power consumption value area 12b (12b1 to 12b5) that stores, for each of the interfaces 23 to 25, 27, and 29, values of power consumed by the respective interfaces 23 to 25, 27, and 29 to recording data on a single recording sheet in a case where recording data received with any of the interfaces 23 to 25, 27, and 29 are recorded on a recording sheet by the printer 21; and a standby power consumption value area 12c (12c1 to 12c5) that stores, for each of the interfaces 23 to 25, 27, and 29, values of power consumed in standby states of the respective interfaces 23 to 25, 27, and 29.

The recording power consumption value area 12b and the standby power consumption value area 12c will now be described with reference to FIGS. 9A and 9B. FIG. 9A is a block diagram showing an electrical configuration of the recording power consumption value area 12b and that of the standby power consumption value area 12c. FIG. 9B shows a formula for determining the amount of power consumed by the respective interfaces 23 to 25, 27, and 29 during recording operation and a formula for determining the amount of power consumed by the respective interfaces 23 to 25, 27, and 29 in a standby state. As shown in FIG. 9B, the recording power consumption value 12b and the standby power consumption value 12c are values used for computing the amount of power consumed by the respective interfaces 23 to 25, 27, and 29 during recording operation and the amount of power consumed by the same in a standby state.

When the recording data received with the interfaces 23 to 25, 27, and 29 are recorded on a recording sheet by the printer 21, values of power consumed by the interfaces 23 to 25, 27, and 29 to record the recording data on a single recording sheet are stored in the recording power consumption value area 12b for each of the interfaces 23 to 25, 27, and 29. In other words, values of power consumed by the interfaces 23 to 25, 27, and 29 to communicate an amount of data corresponding to one page of predetermined size are stored in the recording power consumption value area 12b for each of the interfaces 23 to 2, 27, and 29. Specifically, a value of the power consumed during recording of the recording data received by the USB interface 23 on a single sheet is stored in a USB interface area 12b1 of the recording power consumption value area 12b. Likewise, a value of the power consumed during recording of the recording data received by the wired LAN interface 24 on a single sheet is stored in a wired LAN interface area 12b2 of the recording power consumption value area 12b. A value of the power consumed during recording of the recording data received by the wireless LAN interface 25 on a single sheet is stored in a wireless LAN interface area 12b3 of the recording power consumption value area 12b. A value of the power consumed during recording of the recording data received by the Bluetooth interface 27 on a single sheet is stored in a Bluetooth interface area 12b4 of the recording power consumption value area 12b. A value of the power consumed during recording of the recording data received by the Irsimple LAN interface 29 on a single sheet is stored in an Irsimple interface area 12b5 of the recording power consumption value area 12b.

When the interfaces 23 to 25, 27, and 29 are in a standby state, values of power consumed by the interfaces 23 to 25, 27, and 29 are stored in the standby power consumption value area 12c for each of the interfaces 23 to 25, 27, and 29. In other words, value of power consumed by the interfaces 23 to 25, 27, and 29 in a standby mode for a predetermined time period are stored in the standby power consumption value area 12c for each of the interfaces 23 to 25, 27, and 29. Specifically, a value of the power consumed during the USB interface 23 being in a standby state is stored in a USB interface area 12c1 of the standby power consumption value area 12c. A value of the power consumed during the wired LAN interface 24 being in a standby state is stored in a wired LAN interface area 12c2 of the standby power consumption value area 12c. A value of the power consumed during the wireless LAN interface 25 being in a standby state is stored in a wireless LAN interface area 12c3 of the standby power consumption value area 12c. A value of the power consumed during the Bluetooth interface 27 being in a standby state is stored in a Bluetooth interface area 12c4 of the standby power consumption value area 12c. A value of the power consumed during the Irsimple interface 29 being in a standby state is stored in an Irsimple interface area 12c5 of the standby power consumption value area 12c.

Turning back to FIG. 2, the RAM 13 is rewritable memory for temporarily storing various sets of data. The RAM 13 is provided with a count memory 13a used for counting the number of recording sheets on which recording data are recorded when recording data received by any of the interfaces 23 to 25, 27, and 29 are recorded on a recording sheet by the printer 21. When recording data are received by any of the interfaces 23 to 25, 27, and 29, a count value of the count memory 13a is initialized (see S21 in FIG. 7), and one is added to the count value every time the printer 21 records the recording data on a single sheet (see S23 in FIG. 7). When recording of the received recording data ends, the counted value is added to an area of recording sheet count memory 14c (14c1 to 14c5) assigned to the interface by which the recording data have been received (see S26 in FIG. 7).

The flash memory 14 is rewritable nonvolatile memory, and data stored in the flash memory 14 are kept being stored even after turning off of the power source of the MFP 1. The flash memory 14 includes operational status flag memory 14a that stores operational status flags showing operational statuses of the respective interfaces 23 to 25, 27, and 29; power supply time memory 14b (14b1 to 14b5) that stores power supply times during which power is supplied from the interface power source 22 to the respective interfaces 23 to 25, 27, and 29; and recording sheet count memory 14c (14c1 to 14c5) that stores the number of recording sheets acquired when recording data received by the respective interfaces 23 to 25, 27, and 29 are recorded on recording sheets by the printer 21.

Contents stored in the operational status flag memory 14a, the power supply time memory 14b, and the recording sheet count memory 14c will be described with reference to FIG. 3.

Figure 3A:
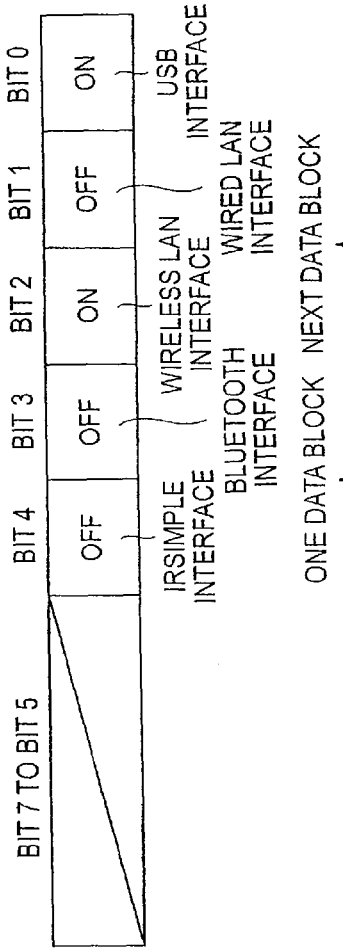
FIGS. 3A to 3C are conceptual views diagrammatically showing contents of operational status flag memory, contents of power supply time memory, and contents of recording sheet count memory.
Figure 3B:
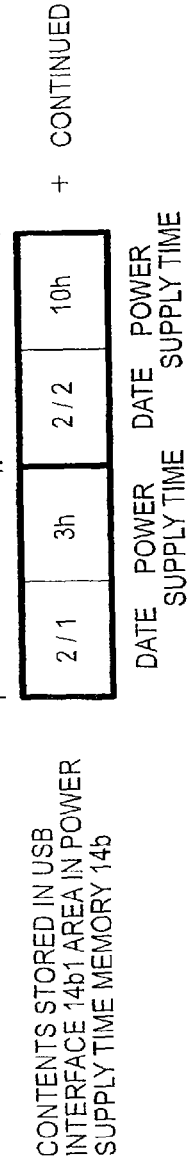
Figure 3C:
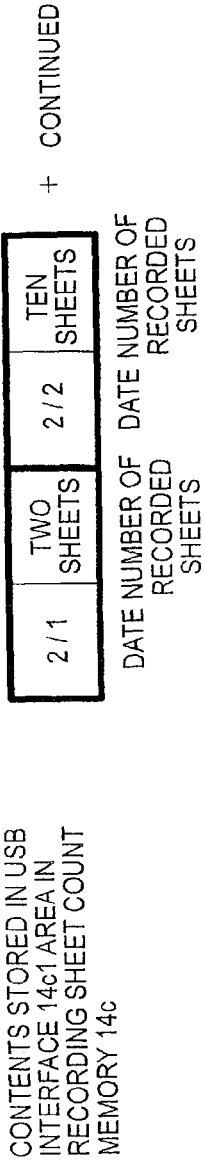

FIG. 3A is a conceptual view diagrammatically showing contents of the operational status flag memory 14a. FIG. 3B is a conceptual view diagrammatically showing contents of the power supply time memory 14b. FIG. 3C is a conceptual view diagrammatically showing contents of the recording sheet count memory 14c.

The operational status flag memory 14a is memory for storing operational status flags showing operational statuses of the respective interfaces 23 to 25, 27, and 29 for each of the interfaces 23 to 25, 27, and 29. As shown in FIG. 3A, the memory is made up of 8 bits (one byte) from a bit 0 to a bit 7. The respective bits show operational statuses of the respective interfaces 23 to 25, 27, and 29. When power is supplied from the interface power source 22 to each of the interfaces 23 to 25, 27, and 29, ON(1) is set on each of the bits. When power from the interface power source 22 is shut off, OFF(0) is set on each of the bits. Supply or shutoff of power to the respective interfaces 23 to 25, 27, and 29 is set by user's operation of the operation panel 4 (see S38 to S42 in FIG. 8).

Specifically, the bit 0 of the operational status flag memory 14a shows the operational status of the USB interface 23; the bit 1 shows the operational status of the wired LAN interface 24; the bit 2 shows the operational status of the wireless LAN 25; the bit 3 shows the operational status of the Bluetooth interface 27; and the bit 4 shows the operational status of the Irsimple interface 29. Bits 5 through 7 are taken as being unoccupied since they are not assigned corresponding interfaces.

The power supply time memory 14b is memory which stores, for each of the interfaces 23 to 25, 27, and 29, power supply times during which power is supplied from the interface power source 22 to the respective interfaces 23 to 25, 27, and 29. The memory 14b includes a USB interface area 14b1; a wired LAN interface area 14b2; a wireless LAN interface area 14b3; a Bluetooth interface area 14b4; an Irsimple interface area 14b5. Since data formats stored in the respective areas are identical with each other, contents of data stored in the USB interface area 14b1 are described as an example with reference to FIG. 3B. Explanations of the other interfaces will be omitted.

As shown in FIG. 3B, the USB interface 14b1 is made up of a plurality of data blocks, and a date and a power supply time are stored in one data block. When power is supplied to the USB interface 23, a power supply time is updated every predetermined time (e.g., every one minute or five minutes) (see S13 and S14 in FIG. 6). The data block acquires a current date from the clock circuit 18 (see FIG. 2) during operation of the MFP 1. When a data block for storing a power supply time of the current date dose not exist, a data block is additionally created subsequently to the existing data blocks (see S11 and S12 in FIG. 6).

The recording sheet count memory 14c is memory which stores, for each of the interfaces 23 to 25, 27, and 29, the number of recording sheets on which recording data received by the respective interfaces 23 to 25, 27, and 29 are recorded by the printer 21. The memory 14c includes a USB interface area 14c1; a wired LAN interface area 14c2; a wireless LAN interface area 14c3; a Bluetooth interface area 14c4; an Irsimple interface area 14c5. Since data formats stored in the respective areas are identical with each other regardless of the nature of the interface, contents of data stored in the USB interface area 14c1 are described as an example with reference to FIG. 3C. Explanations of the other interfaces will be omitted.

As shown in FIG. 3C, the USB interface 14c1 is made up of a plurality of data blocks, and a date and the number of recording sheets are stored in one data block. When recording data received by the USB interface 23 are recorded on recording sheets by the printer 21, the number of recorded sheets is added to the number of recording sheets (see S26 in FIG. 7). The data block acquires a current date from the clock circuit 18 (see FIG. 2) during operation of the MFP 1. When a data block for storing the number of recorded sheets of the current date does not exist, a data block is additionally created subsequently to the existing data blocks (see S11 and S12 in FIG. 6).

Turning back to FIG. 2, the clock circuit 18 has an internal clock that measures a current date and time. The interface power source 22 is for supplying the respective interfaces 23 to 25, 27, and 29 with power required to activate the interfaces 23 to 25, 27, and 29.

The USB interface 23 is a circuit that enables data communication with the PC 51 when connected to the USB interface 58 (see FIG. 4) of the PC 51 through the USB cable 100. The wired LAN interface 24 is a circuit that enables data communication with the PC 51 when connected to the wired LAN interface 59 (see FIG. 4) of the PC 51 through the LAN cable 200.

The wireless LAN interface 25 is a circuit that has a wireless LAN interface antenna 26 and that enables data communication with the PC 51 when connected to the wireless LAN interface 60 (see FIG. 4) of the PC 51 through wireless communication 300. The Bluetooth interface 27 is a circuit that has a Bluetooth interface antenna 28 and that enables data communication with the PC 51 when connected to the Bluetooth interface 62 (see FIG. 4) of the PC 51 through wireless communication 400.

The Irsimple interface 29 is a circuit that has an Irsimple interface antenna 30 and that enables data communication with the PC 51 when connected to the Irsimple interface 64 (see FIG. 4) of the PC 51 through infrared communication 500.

Each of the switches 31 to 35 includes a field effect transistor (FET) switch. FIG. 2 shows an example of FET switch using an FET of p-channel type. Each of the FET switches has a gate terminal, a drain terminal, and a source terminal. Respective gate terminals are connected to the input/output port 41, and respective drain terminals are connected to the interface power source 22. Respective source terminals are connected to power inputs (+Vcc) of the respective interfaces 23 to 25, 27, and 29. When a signal is input from the CPU 11 to the gate terminal of a certain FET switch so as to activate the switch, the drain terminal and the source terminal of that FET switch are brought into electrical conduction, whereupon power is supplied from the interface power source 22 to the interface connected to the source terminal.

According to a signal input from the CPU 11, the switch 31 supplies or shuts off the power fed from the interface power source 22 to the USB interface 23. According to a signal input from the CPU 11, the switch 32 supplies or shuts off the power fed from the interface power source 22 to the wired LAN interface 24. According to a signal input from the CPU 11, the switch 33 supplies or shuts off the power fed from the interface power source 22 to the wireless interface 25. According to a signal input from the CPU 11, the switch 34 supplies or shuts off the power fed from the interface power source 22 to the Bluetooth interface 27. According to a signal input from the CPU 11, the switch 35 supplies or shuts off the power fed from the interface power source 22 to the Irsimple interface 29.

Since the FET switches are used for the switches 31 to 35, the respective switches 31 to 35 can be switched with a low power consumption when the CPU 11 switches the respective switches 31 to 35 through the input/output ports 41. Since the FET switch requires small standby power during operation, power consumption can be reduced further.

Figure 4:
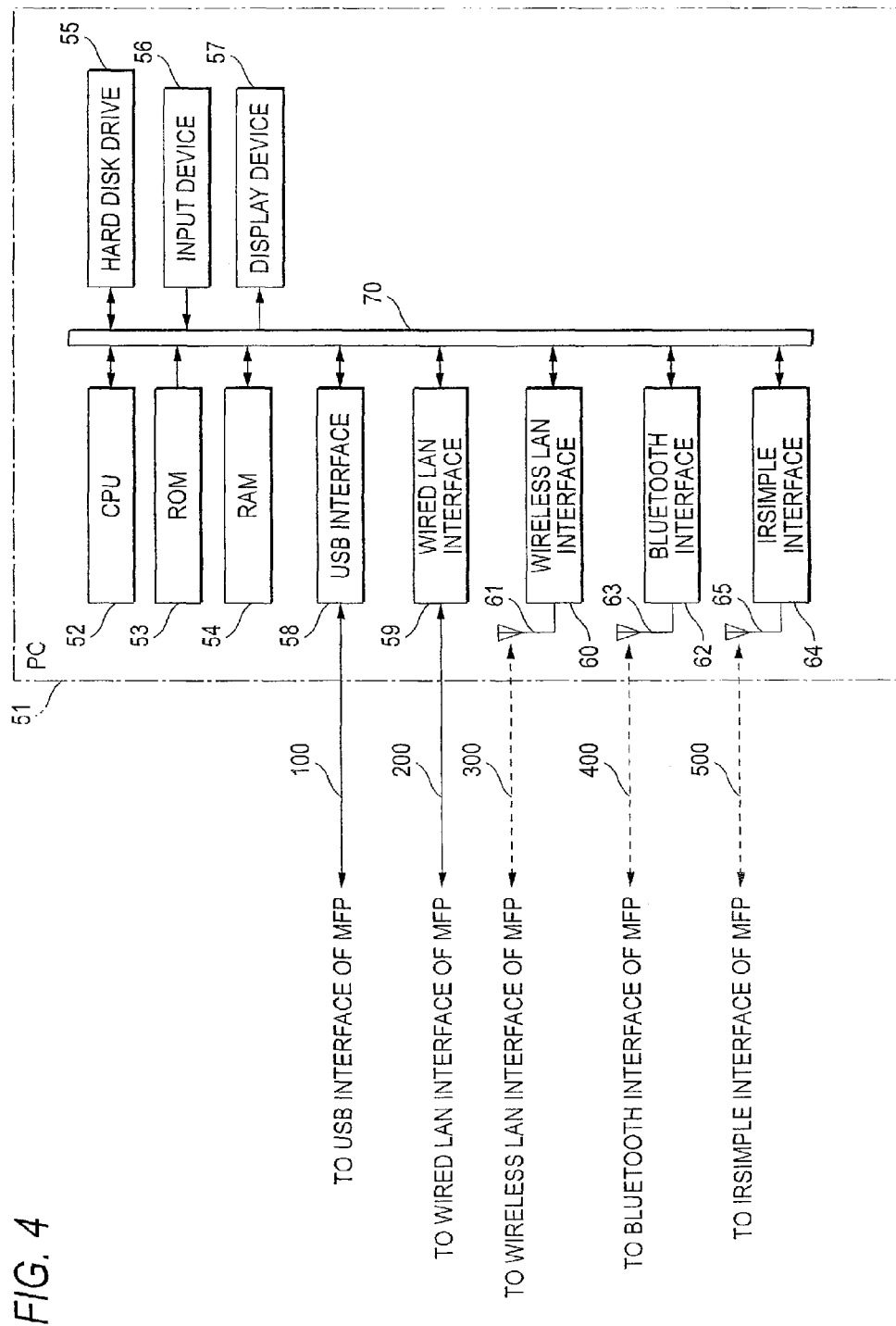
FIG. 4 is a block diagram showing an electrical configuration of the PC.

The electrical configuration of the PC 51 will now be described with reference to FIG. 4. FIG. 4 is a block diagram showing an electrical configuration of the PC 51. The PC 51 includes a CPU 52, ROM 53, RAM 54, a hard disk drive 55, an input device 56, a display device 57, the USB interface 58, the wired LAN interface 59, the wireless LAN interface 60, the Bluetooth interface 62, and the Irsimple interface 64. They are interconnected through a bus line 70.

The CPU 52 controls fixed values or programs stored in the ROM 53, the RAM 54, and the hard disk drive 55 and respective functions of the PC 51, and also controls respective sections connected through the bus line 70 pursuant to various signals transmitted or received by the USB interface 58, the wired LAN interface 59, the wireless LAN interface 60, the Bluetooth interface 62, and the Irsimple interface 64.

The ROM 53 is unrewritable memory that stores various control programs executed by the PC 51. The RAM 54 is rewritable memory for temporarily storing various sets of data. The hard disk drive 55 is rewritable nonvolatile memory, and data stored in the hard disk drive 55 are kept being stored even after turning off of the power source of the PC 51. Various pieces of application software, recording data created by use of the application software, and the like, are recorded in the hard disk drive 55. The user can record a set of recording data on a recording sheet by transmitting the recording data to the MFP 1. When recording data are transmitted to the MFP 1, the data are transmitted by any of the interfaces 58 to 60, 62, and 64 to be described later.

The input device 56 is used for managing the PC 51 or utilizing various pieces of application software stored in the hard disk drive 55. The input device 56 is, for example, a keyboard or a mouse. The display device 57 is used for managing the PC 51 or utilizing various pieces of application software. The display device is, for example, a liquid-crystal display.

The USB interface 58 is a circuit that enables data communication with the MFP 1 when connected to the USB interface 23 (see FIG. 2) of the MFP 1 through the USB cable 100. The wired LAN interface 59 is a circuit that enables data communication with the MFP 1 when connected to the wired LAN interface 24 (see FIG. 2) of the MFP 1 through the LAN cable 200.

The wireless LAN interface 60 is a circuit that has a wireless LAN interface antenna 61 and that enables data communication with the MFP 1 when connected to the wireless LAN interface 25 (see FIG. 2) of the MFP 1 through wireless communication 300. The Bluetooth interface 62 is a circuit that has a Bluetooth interface antenna 63 and that enables data communication with the MFP 1 when connected to the Bluetooth interface 27 (see FIG. 2) of the MFP 1 through wireless communication 400.

The Irsimple interface 64 is a circuit that has an Irsimple interface antenna 65 and that enables data communication with the MFP 1 when connected to the Irsimple interface 29 (see FIG. 2) of the MFP 1 through infrared communication 500.

Figure 5:
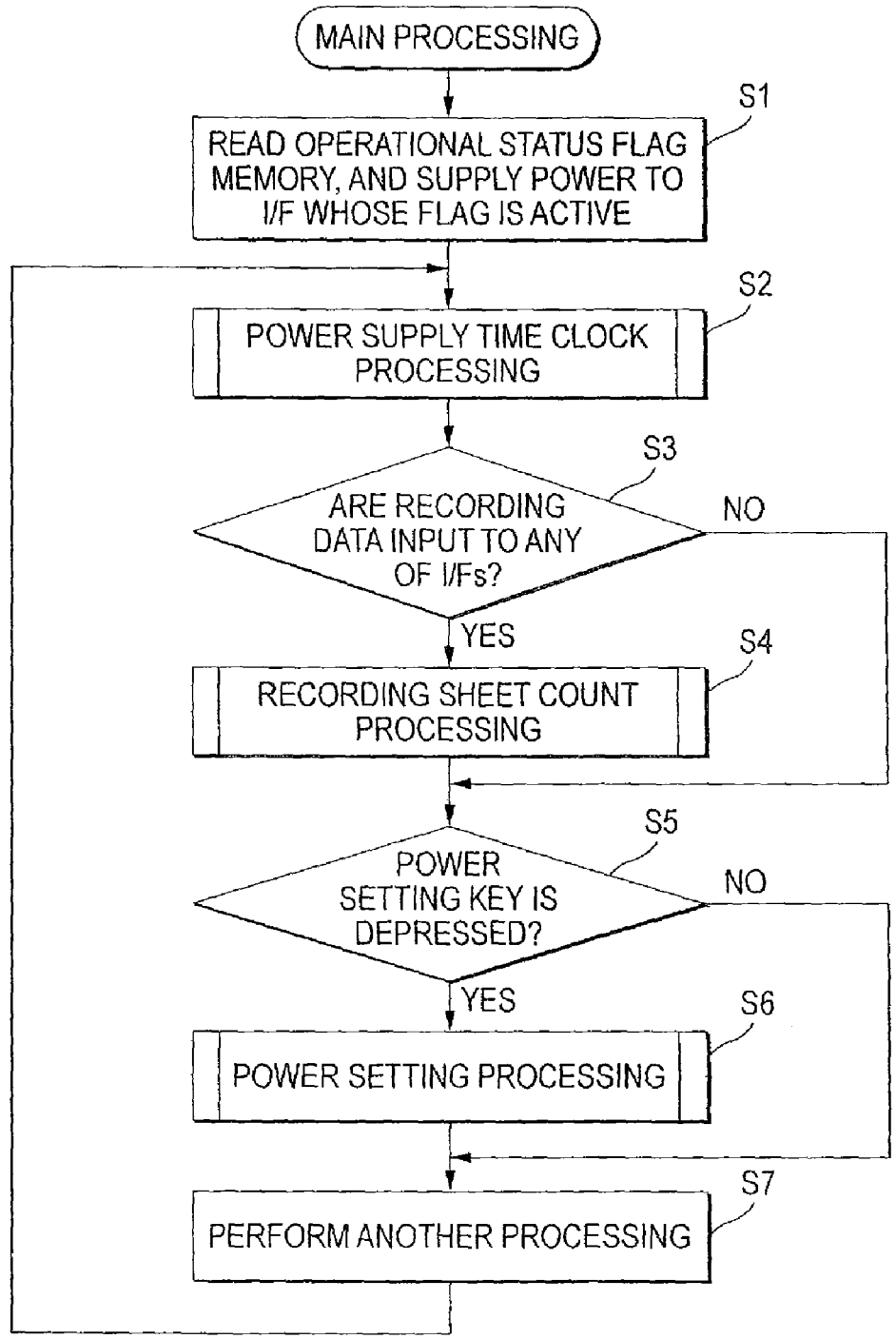
FIG. 5 is a flowchart showing main processing of the MFP.

With reference to FIG. 5, main processing executed by the CPU 11 of the MFP 1 will now be described.

FIG. 5 is a flowchart showing main processing of the MFP 1 which is repeatedly performed from when the main power of the MFP 1 is turned on until when the main power is shut off. Through main processing, the operational status flag memory 14a is first read; and any of the switches 31 to 35 of the interfaces 23 to 25, 27, and 29 having an active operational status flag is turned on, thereby supplying power to the any of the interfaces 23 to 25, 27, and 29 (S1). As mentioned above, supply of power to the respective interfaces 23 to 25, 27, and 29 (setting ON to an operational status flag) or shutoff of power to the same (setting OFF to an operational status flag) is set by the user's operation of the operation panel 4 (see S38 to S42 in FIG. 8). After processing pertaining to S1, power supply time counting processing is performed (S2).

Figure 6:
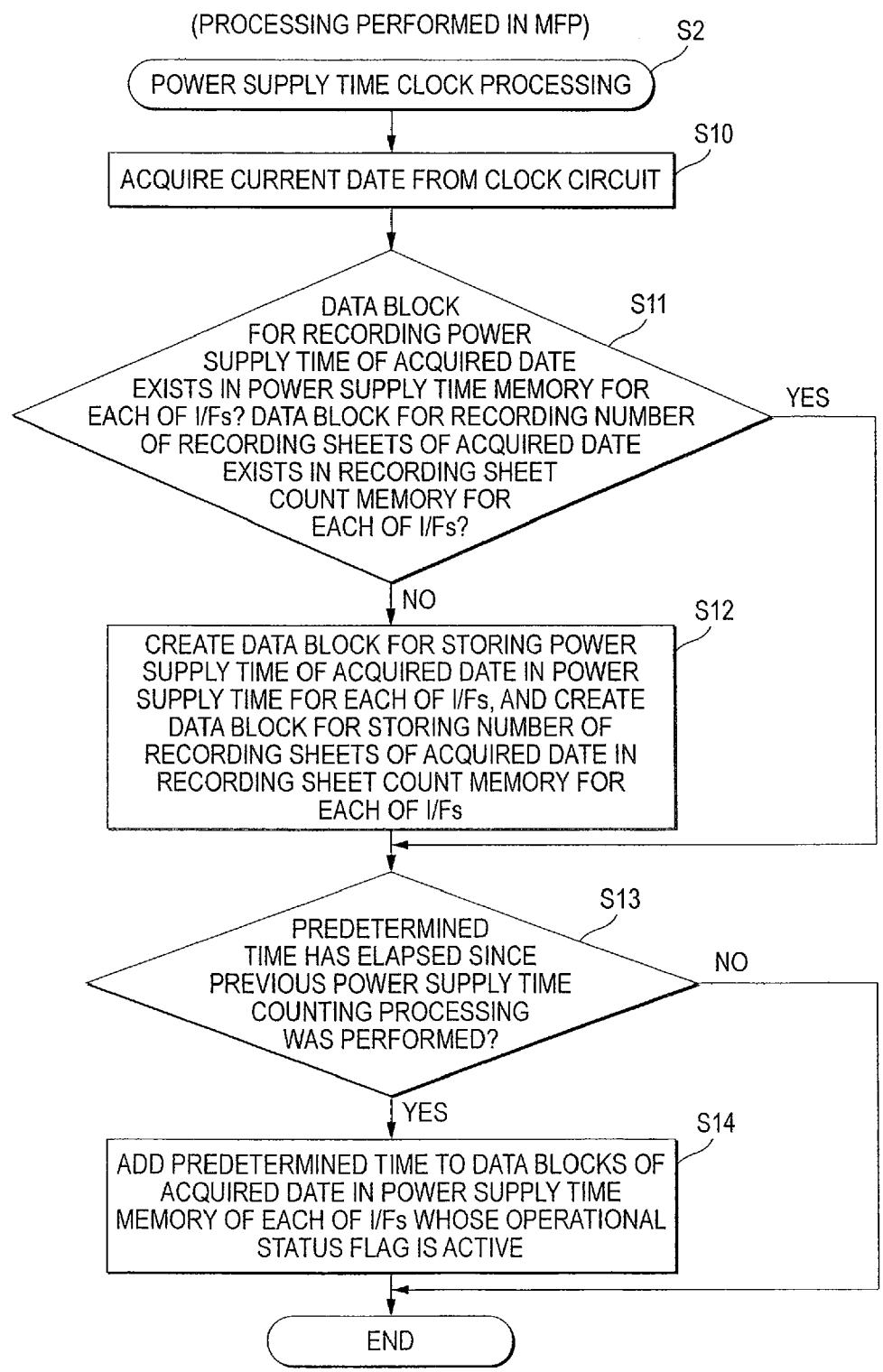
FIG. 6 is a flowchart showing power supply time count processing of the MFP.

With reference to a flowchart shown in FIG. 6, power supply time clock processing (S2) is described. Power supply time clock processing (S2) is processing for creating a data block for storing a power supply time and the number of recording sheets for each of the interfaces 23 to 25, 27, and 29 and updating the power supply time during which power has been supplied to the respective interfaces 23 to 25, 27, and 29.

At first of the power supply time clock processing (S2), a current date is acquired from the clock circuit 18 (S10). Then, it is determined whether or not a data block for storing a power supply time of the acquired date exists in the power supply time memory 14b of each of the interfaces 23 to 25, 27, and 29 and whether or not a data block for storing the number of recording sheets of the acquired date exists in the recording sheet count memory 14c of each of the interfaces 23 to 25, 27, and 29 (S11). When the data block for the acquired date dose not exist (No in S11), a data block for storing a power supply time of the acquired date is created in the power supply time memory 14b of each of the interfaces 23 to 25, 27, and 29, and a data block for storing the number of recording sheets of the acquired date is created in the recording sheet count memory 14c of each of the interfaces 23 to 25, 27, and 29 (S12). In the meantime, when data blocks for the acquired date exist (Yes in S11), processing pertaining to S12 is skipped, to thus proceed to S13.

During processing pertaining to S13, it is determined whether or not a predetermined period of time (e.g., one minute or five minutes) has elapsed since previous power supply time count processing was performed (S13). When a predetermined period of time has elapsed (Yes in S13), the predetermined period of time is added to data blocks of an acquired date in the power supply time memory 14b of each of interfaces 23 to 25, 27, and 29 whose operational status flag is active (S14), and power supply time processing (S2) ends. In the meantime, when a predetermined period of time has not elapsed (No in S13), processing pertaining to S14 is skipped, and power supply time clock processing (S2) ends. By power supply time clock processing (S2) as shown in the flowchart of FIG. 6, the MFP 1 can create data blocks for storing a power supply time or the number of recording sheets (see FIGS. 3B and 3C). Moreover, the power supply time during which power is supplied to each of the interfaces 23 to 25, 27, and 29 can be updated for each of the interfaces 23 to 25, 27, and 29.

After the power supply time clock processing (S2) ends, processing returns to S3 in FIG. 5. At processing pertaining to S3, it is determined whether or not recording data are input to one of the interfaces 23 to 25, 27, and 29 (S3). When recording data are input (Yes in S3), recording sheet count processing is performed (S4). In the meantime, when recording data are input to none of the interfaces (No in S3), processing pertaining to S4 is skipped, to thus proceed to S5.

Recording sheet count processing (S4) will be described with reference to a flowchart of FIG. 7. Recording sheet count processing (S4) is for counting the number of recorded sheets when the recording data input to any of the interfaces 23 to 25, 27, and 29 are recorded on a recording sheet by the printer 21. At first of the recording sheet count processing (S4), the count memory 13a is cleared (S21). It is determined whether or not the printer 21 has finished recording of data on one recording sheet (S22). When recording of data on one recording sheet has finished (Yes in S22), one is added to the count memory 13a (S23). In the meantime, when recording of data on a recording sheet has not yet been finished (No in S22), processing returns to S22, where end of recording operation is awaited.

Next, it is determined whether or not recording of all recording data input to any of the interfaces 23 to 25, 27, and 29 has finished (S24). When recording of all of recording data has not yet finished (No in S24), processing returns to S22, and above-described processing pertaining to S22 to S24 is iterated. In contrast, when recording of all of data has finished (Yes in S24), a current time is acquired from the clock circuit 18 (S25). In relation to the recording sheet count memory 14c of an area corresponding to the one of the interfaces 23 to 25, 27, and 29 by which the recording data recorded by the printer 21 have been input, the value of the count memory 13a is added to the data block of the date already acquired through power supply time count processing shown in FIG. 6 (see S12 in FIG. 6) (S26), and recording sheet count processing (S4) ends.

Figure 7:
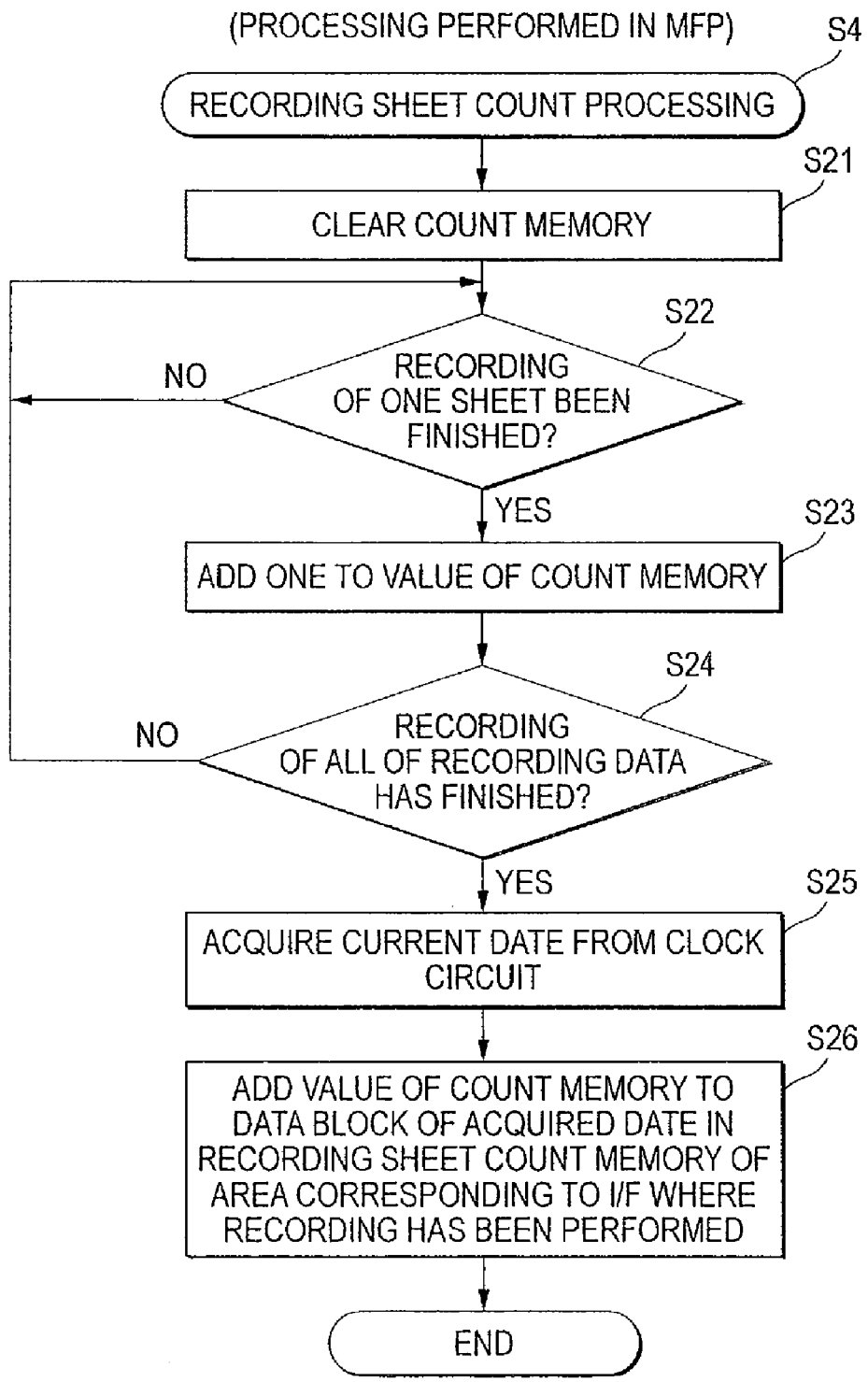
FIG. 7 is a flowchart showing recording sheet count processing of the MFP.

When the recording data input by any of the interfaces 23 to 25, 27, and 29 are recorded on a recording sheet by the printer 21, the number of recorded sheets can be counted through recording sheet count processing (S4) shown in the flowchart of FIG. 7. The count value is added to the recording sheet count memory 14c of the area corresponding to the one of the interfaces 23 to 25, 27, and 29 by which the recording data have been input.

After completion of recording sheet count processing (S4), processing returns to S5 in FIG. 5. During processing pertaining to S5, it is determined whether or not the power setting key 15a is depressed (S5). When the power setting key 15a is depressed (Yes in S5), power setting processing is performed (S6). In the meantime, when the power setting key 15a is not depressed (No in S5), processing pertaining to S6 is skipped, to thus proceed to S7.

Power setting processing (S6) is described with reference to a flowchart of FIG. 8. Power setting processing (S6) is for displaying on the LCD 16 amounts of power consumed by the respective interfaces 23 to 25, 27, and 29; and turning on or off the switches 31 to 35 in accordance with user's operation, to thus supply power to the respective interfaces 23 to 25, 27, and 29 or shut off the power.

At first of the power setting processing (S6), a message "Which of time intervals do you display power consumption, a daily basis, a weekly basis, or a monthly basis?" is displayed on the LCD 16 (S31). It is determined which one of the time intervals is selected by the user (S32). When the user has selected a daily basis, data blocks of the current date are read from the power supply time memory 14b and the recording sheet count memory 14c (S33). In the meantime, when the user has selected a weekly basis, data blocks of the current date to data blocks of seven days past are read from the power supply time memory 14b and the recording sheet count memory 14c (S34) When the user has selected a monthly basis, data blocks of the current date to data blocks of thirty-one days past are read from the power supply time memory 14b and the recording sheet count memory 14c (S35).

Next, amount of power consumed by the respective interfaces 23 to 25, 27, and 29 during recording operation (see FIG. 9) and power consumed by the same in a standby state (see FIG. 9) are computed by use of the thus-read data blocks (S36). A histogram (a block graph) whose horizontal axis shows a time interval selected by the user and whose vertical axis shows an amount of power consumption is displayed on the left half of the LCD 16. A menu for setting power of the respective interfaces 23 to 25, 27, and 29 is displayed on the right half of the LCD 16 (S37) (see FIG. 10).

It is determined whether or not the user has changed the power settings of the interfaces 23 to 25, 27, and 29 (S38) When a change has been made to the power settings of the interfaces 23 to 25, 27, and 29 (Yes in S38), it is determined whether or not an interface whose power is to be newly shut off exists in the interfaces 23 to 25, 27, and 29 (S39). In contrast, when no change is made to the power settings of the interfaces 23 to 25, 27, and 29 (No in S38), processing pertaining to S39 to S42 is skipped. Then, the power setting processing (S6) ends.

When an interface whose power is to be newly shut off is determined to exist in the interfaces 23 to 25, 27, and 29 at processing pertaining to S39 (Yes in S39), a switch of the interface whose power is to be shut off, among the switches 31 to 35 of the interfaces 23 to 25, 27, and 29, is turned off, to thus shut off power to the interface among the interfaces 23 to 25, 27, and 29. And an operational status flag of that interface is set to OFF (S40). In contrast, when an interface whose power is to be newly shut off does not exist among the interfaces 23 to 25, 27, and 29 (No in S39), processing pertaining to S40 is skipped, to thus proceed to S41.

At processing pertaining to S41, it is determined whether or not an interface which is to be newly supplied with power exists among the interfaces 23 to 25, 27, and 29 (S41). When an interface which is to be newly supplied with power exists among the interfaces 23 to 25, 27, and 29 (Yes in S41), a switch of the interface which is to be supplied with power, among the switches 31 to 35 of the interfaces 23 to 25, 27, and 29, is turned on, to thus supply power to the interface in the interfaces 23 to 25, 27, and 29. And an operational status flag of that interface is set ON (S42). Then, power setting processing (S6) ends. In contrast, when an interface which is to be newly supplied with power does not exist among the interfaces 23 to 25, 27, and 29 (No in S41), processing pertaining to S42 is skipped, and power setting processing (S6) ends. Amounts of power consumed by the respective interfaces 23 to 25, 27, and 29 can be displayed through power setting processing (S6). Accordingly, the user can perform switching as to whether or not power is supplied to the respective interfaces 23 to 25, 27, and 29, with reference to the display of the amounts of power consumption.

After completion of power setting processing (S6), processing returns to S7 in FIG. 5, and other processing operations are performed (S7). Then, processing returns to S2, where above-described processing pertaining to S2 to S7 is iterated. Here, other processing operations include, for example, reading of a document performed when the document read key 15d is depressed, and the like. By main processing shown in FIG. 5, operational statuses of the respective interfaces 23 to 25, 27, and 29 can be monitored, and the user can confirm amounts of power consumed by the respective interfaces 23 to 25, 27, and 29. In accordance with the amounts of power consumption, the user can perform switching as to whether or not power is supplied to the respective interfaces 23 to 25, 27, and 29.

Figure 10:
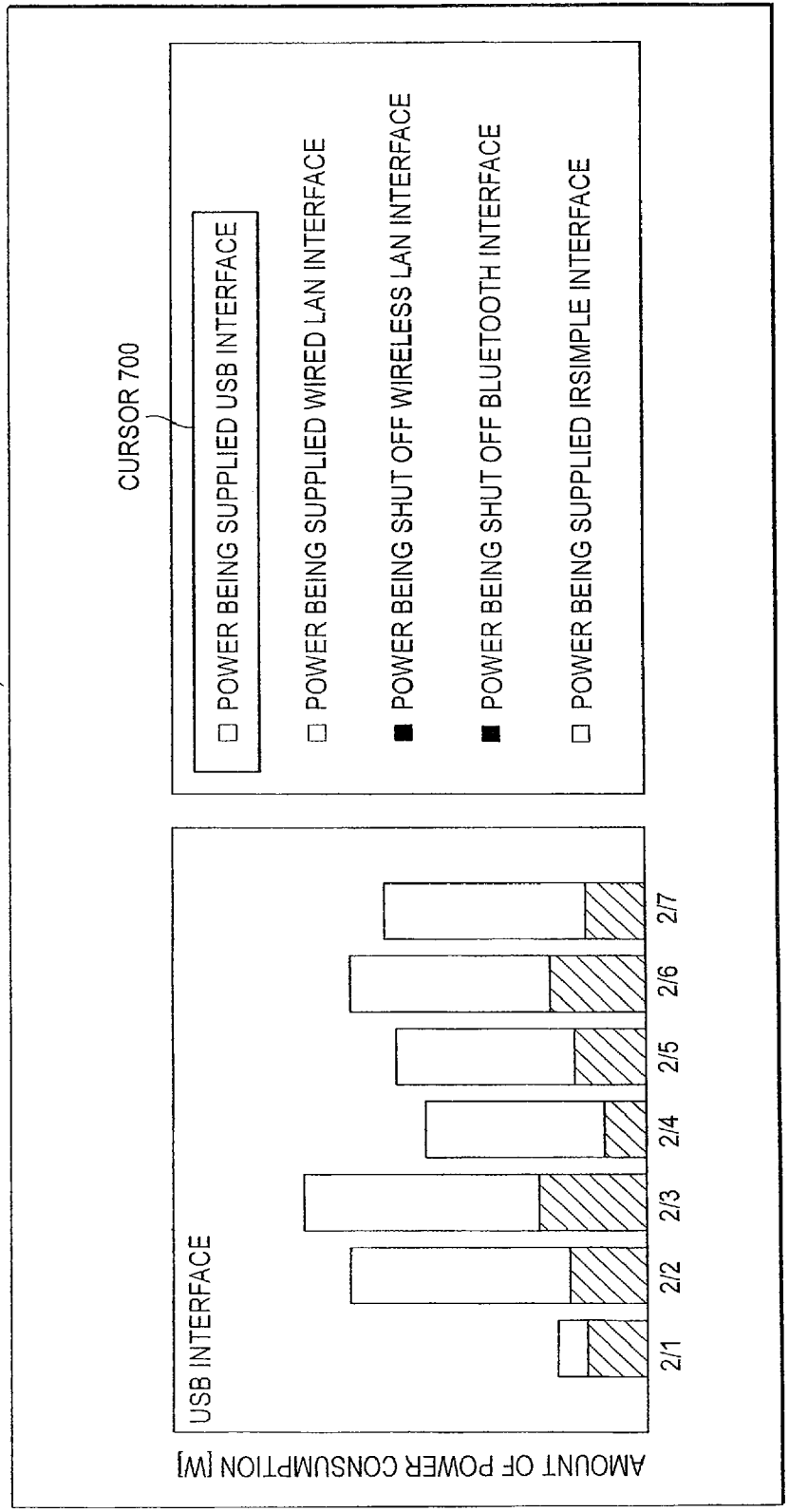
FIG. 10 is a view showing a power setting menu (a display screen) appearing on an LCD.

With reference to FIG. 10, an example display screen displayed on the LCD 16 when the power setting key 15a of the MFP 1 is depressed will be described.

FIG. 10 shows a power setting menu that is displayed on the LCD 16 when the power setting key 15a is depressed. The state of power supplied to the respective interfaces 23 to 25, 27, and 29 and a cursor 700 are displayed on the right half of the display screen. The designation of the interface selected from the interfaces 23 to 25, 27, and 29 by the cursor 700 and bar graphs showing the amount of power consumed by the interface are displayed on the left half of the display screen. FIG. 10 is an example display screen that appears when the USB interface 23 is selected by the cursor 700 and when a weekly basis is selected as a time interval at which amounts of power consumption are displayed.

Seven bar graphs are displayed on the left half of the display screen, and one of them shows an amount of power consumed in a certain day. The number of appearing bar graphs is increased or decreased depending on the time interval selected by the user. Blank areas in the bar graphs show amounts of power consumed during recording operation in a certain day. As shown in FIG. 9B, values of the power consumption are determined by multiplying values of power consumed by selected one of the interfaces 23 to 25, 27, and 29 to recording data on one recording sheet (values in the recording power consumption value area 12b), by the number of sheets on which there are recorded the recording data received by the selected one of the interfaces 23 to 25, 27, and 29 (values in the recording sheet count memory 14c). In the meantime, hatched areas of the bar graphs show amounts of power consumed in a standby state in a certain day. As shown in FIG. 9B, values of the power consumption are determined by multiplying values of power consumed by the selected one of the interfaces 23 to 25, 27, and 29 in a standby state (values in the standby power consumption value area 12c) by times during which power is supplied to the selected one of the interfaces 23 to 25, 27, and 29 (values in the power supply time memory 14b).

Names of the respective interfaces are displayed on the right half of the display screen. When power is supplied to the interfaces 23 to 25, 27, and 29 from the interface power source 22, a "power being supplied" is displayed beside the name of an interface. When power is not supplied, "power being shut off" is displayed. For instance, in the case of the USB interface 23 selected by the cursor 700, "Power being supplied USB interface" is displayed, whereby it can be confirmed that power is supplied to the USB interface 23.

By operation of an up or down key of the cross key 15b, the position of the cursor 700 can be moved. When the cursor 700 is placed at the name of another interface (that is, the other interface is selected), amounts of power consumed by the selected one of the interfaces 23 to 25, 27, and 29 are displayed on the left half of the LCD 16.

Specifically, the user can confirm operational statuses of the respective interfaces 23 to 25, 27, and 29 by checking the amounts of power consumed by the respective interfaces 23 to 25, 27, and 29. The power consumed by the interfaces 23 to 25, 27, and 29 can be reduced by shutting off power to any of the interfaces 23 to 25, 27, and 29 determined to be unnecessary.

When power to the interfaces 23 to 25, 27, and 29 is shut off, the cursor 700 is placed at the position of the name of an interface whose power is desired to be shut off. By operation of a left or right key of the cross key 15b, the message "power being supplied" appearing on the display screen is changed to "power being shut off." When the enter key 15c is depressed, the change is reflected on the interfaces 23 to 25, 27, and 29, and power supplied from the interface power source 22 is shut off.

In accordance with the amounts of power consumed by the respective interfaces 23 to 25, 27, and 29 appearing on the LCD 16, the user can determine whether or not each of the interfaces is used. Power can be supplied to the respective interfaces 23 to 25, 27, and 29 or power supply is shut off by inputting a command based on the determination to the MFP 1 by the operation key 15. When power is shut off, the power consumed by the interfaces can be reduced.

While the present invention has been shown and described with reference to certain exemplary embodiments thereof, it will be understood by those skilled in the art that various changes in form and details may be made therein without departing from the spirit and scope of the invention as defined by the appended claims.

For instance, in the above exemplary embodiment, the number of recorded sheets obtained in a case where recording data received by the interfaces 23 to 25, 27, and 29 are recorded on recording sheets by the printer 21 is counted as operational status (statuses of use) of the respective interfaces 23 to 25, 27, and 29. However, amounts of data transmitted or received by the interfaces 23 to 25, 27, and 29, the number of accesses made to the interfaces 23 to 25, 27, and 29, and the like, may also be counted.

In the above exemplary embodiment, the amount of power consumption is displayed as a ground for the user determining whether or not each of the interfaces 23 to 25, 27, and 29 is used. However, as long as a user can confirm operational statuses (states of use) of the respective interfaces 23 to 25, 27, and 29, any information may be displayed. That is, for example, quantities of data (e.g., recording data or other data) transmitted or received by the interfaces 23 to 25, 27, and 29; the number of accesses made to the interfaces 23 to 25, 27, and 29; the number of sheets recorded when recording data received by the interfaces 23 to 25, 27, and 29 are recorded on recording sheets by the printer 21; and the like, may also be displayed.

In the above exemplary embodiment, a histogram (a bar graph) of amounts of power consumed by the interfaces 23 to 25, 27, and 29 is displayed as a material serving as a ground for the user determining whether or not each of the interfaces 23 to 25, 27, and 29 is used. However, as long as a user can confirm operational statuses (states of use) of the respective interfaces 23 to 25, 27, and 29. Therefore, for example, operational statuses may also be displayed by use of a line graph, a pie graph, and the like. Alternatively, numerals may also be displayed in the form of a table.

What is claimed is:

1. A multi-function peripheral device comprising:
   a plurality of interfaces that communicate data with an external devices;
   a power source for supplying the interfaces with power required for the respective interfaces to operate;
   a monitoring unit that monitors amounts of power consumed by the respective interfaces;
   a display unit that displays the amounts of power consumed by each of the interfaces monitored by the monitoring unit and information indicating whether power is supplied to each of the interfaces;
   an input unit that is capable of inputting a command indicating whether or not power is to be supplied from the power source to each of the interfaces based on the display on the display unit;
   a power control unit that controls to supply power to an interface for which a command indicating that power is to be supplied is inputted by the input unit, and controls to shut off power to an interface for which a command indicating that power is not to be supplied is inputted by the input unit;
   a recording unit that records data on a recording medium in accordance with data received by the interfaces,
   a count unit that counts an amount of consumption of recording medium consumed for recording data, which is received by each of the interfaces; and
   a clock unit that measures a power supply time during which power is supplied for each of the interfaces,
   wherein the monitoring unit monitors the amount of consumption of recording medium counted by the counting unit and the power supply time measured by the clock unit for each of the interfaces to monitor the amount of power consumed by each of the interfaces.

2. The multi-function peripheral device according to claim 1, further comprising a plurality of field effect transistor switches, each of which switches between supply and shutoff of power from the power source to respective one of interfaces,
wherein the power control unit controls the field effect transistor switches to switch in accordance with the command inputted by the input unit.

3. The multi-function peripheral device according to claim 1,
wherein both the amount of power consumed by each of the interfaces monitored by the monitoring unit and the information indicating whether power is supplied to each of the interfaces are used for inputting the command to the input unit.

4. The multi-function peripheral device according to claim 1,
wherein the amount of power consumed by each of the interfaces monitored by the monitoring unit and the information indicating whether power is supplied to each of the interfaces are simultaneously displayed on the display unit.

5. A multi-function peripheral device comprising:
a plurality of interfaces that communicate with at least one external device;
a power source for supplying the plurality of interfaces with power;
a plurality of switches provided for the plurality of interfaces, each of the switches being configured to switch power supply from the power supply source to respective one of the interfaces between a supply state and a shutoff state;
an obtaining unit which obtains an amount of power consumption consumed by each of the interfaces, respectively;
a display unit which displays information based on the amount of power consumption consumed by each of the interfaces obtained by the obtaining unit and whether each of the interfaces are in the supply state or the shutoff state;
an input unit which inputs a command indicating whether power is to be supplied from the power source to each of the interfaces based on the display on the display unit;
a controller which controls each of the switches to switch between the supply state and the shutoff state, based on the command inputted by the input unit;
a recording unit that records data on a recording medium in accordance with data received by the interfaces,
a count unit that counts an amount of consumption of recording medium consumed for recording data, which is received by each of the interfaces; and
a clock unit that measures a power supply time during which power is supplied for each of the interfaces,
wherein the obtaining unit obtains the amount of consumption of recording medium counted by the counting unit and the power supply time measured by the clock unit for each of the interfaces to obtain the amount of power consumed by each of the interfaces.

6. The multi-function peripheral device according to claim 5, further comprising a storage unit which stores unit time consumption amounts which are defined for the respective interfaces,
wherein the obtaining unit obtains the amount of power consumption by multiplying the power supply time of each of the interfaces by the unit time consumption amount for respective one of the interfaces stored in the storage unit.

* * * * *

UNITED STATES PATENT AND TRADEMARK OFFICE
CERTIFICATE OF CORRECTION

PATENT NO. : 8,090,964 B2
APPLICATION NO. : 12/039329
DATED : January 3, 2012
INVENTOR(S) : Tetsuya Kitajima It is certified that error appears in the above-identified patent and that said Letters Patent is hereby corrected as shown below:

Cover page, Section (54), Line 1:

Please change "PERPIHERAL" to --PERIPHERAL--.

Signed and Sealed this
Twentieth Day of March, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,090,964 B2 | Page 1 of 1 |
| APPLICATION NO. | : 12/039329 | |
| DATED | : January 3, 2012 | |
| INVENTOR(S) | : Tetsuya Kitajima | |

It is certified that error appears in the above-identified patent and that said Letters Patent is hereby corrected as shown below:

Title page, Item (54) and at column 1, line 1, Title:

Please change "PERPIHERAL" to --PERIPHERAL--.

This certificate supersedes the Certificate of Correction issued March 20, 2012.

Signed and Sealed this
Tenth Day of April, 2012

David J. Kappos
*Director of the United States Patent and Trademark Office*